(12) United States Patent  
Classen et al.

(10) Patent No.: US 8,443,666 B2
(45) Date of Patent: May 21, 2013

(54) RATE-OF-ROTATION SENSOR AND METHOD FOR OPERATING A RATE-OF-ROTATION SENSOR

(75) Inventors: Johannes Classen, Reutlingen (DE); Sebastian Gracki, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 12/747,846

(22) PCT Filed: Nov. 10, 2008

(86) PCT No.: PCT/EP2008/065236
§ 371 (c)(1),
(2), (4) Date: Sep. 1, 2010

(87) PCT Pub. No.: WO2009/077263
PCT Pub. Date: Jun. 25, 2009

(65) Prior Publication Data
US 2010/0326188 A1    Dec. 30, 2010

(30) Foreign Application Priority Data
Dec. 18, 2007    (DE) .......................... 10 2007 060 942

(51) Int. Cl.
*G01C 19/56*    (2012.01)
(52) U.S. Cl.
USPC ...................................................... 73/504.12

(58) Field of Classification Search
USPC ............................................... 73/504.12, 510
See application file for complete search history.

(56) References Cited

U.S. PATENT DOCUMENTS

| 5,703,293 | A | 12/1997 | Zabler et al. |
| 6,928,872 | B2 * | 8/2005 | Durante et al. ............. 73/504.04 |
| 7,316,161 | B2 | 1/2008 | Willig et al. |
| 2007/0220973 | A1 | 9/2007 | Acar |

FOREIGN PATENT DOCUMENTS

| DE | 19519488 | 11/1996 |
| EP | 1365211 | 11/2003 |
| WO | WO 03/058167 | 7/2003 |

OTHER PUBLICATIONS

International Search Report, PCT International Patent Application No. PCT/EP2008/065236, dated Mar. 10, 2009.

* cited by examiner

*Primary Examiner* — John Chapman, Jr.
(74) *Attorney, Agent, or Firm* — Kenyon & Kenyon LLP

(57) ABSTRACT

A rate-of-rotation sensor having a substrate and a first Coriolis element are provided, an excitation arrangement being provided for the excitation of vibrations of the first Coriolis element in a first direction, a first detection arrangement being provided for detecting a first deflection of the first Coriolis element in a third direction running generally perpendicular to the first direction; characterized by the first Coriolis element being developed as balancing rocker.

18 Claims, 2 Drawing Sheets

RATE-OF-ROTATION SENSOR AND METHOD FOR OPERATING A RATE-OF-ROTATION SENSOR

FIELD OF THE INVENTION

The present invention relates to a rate-of-rotation sensor.

BACKGROUND INFORMATION

German Patent Application No. DE 195 19 488 A1 describes a rate-of-rotation sensor having a first and a second vibrating mass, an excitation arrangement inducing the first and the second vibrating mass to a vibration, a first deflection of the first vibrating mass being recorded by an evaluation arrangement, and a second deflection of the second vibrating mass being recorded by an additional evaluation arrangement, the first and the second deflection not being provided parallel to each other and not parallel to the oscillation. A disadvantage of this rate-of-rotation sensor is that the first deflection cannot be evaluated in a differential manner, so that a first evaluation signal from the evaluation element is not only a function of the Coriolis force but also features relatively high potential interference.

SUMMARY

A rate-of-rotation sensor according to an example embodiment of the present invention as well as an example method according to the present invention for operating a rate-of-rotation sensor may have the advantage that a fully differential evaluation of the first deflection is possible on a relatively small area. The excitation arrangement excites the first Coriolis element into vibrations parallel to the first direction. A first rate of rotation of the rate-of-rotation sensor about a second axis which runs parallel to a second direction extending essentially perpendicular both to the first and the third direction, generates a first Coriolis force on the first Coriolis element, which acts parallel to the third direction and generates the first deflection parallel to the third direction due to the fact that the first Coriolis element is designed as balancing rocker. The measuring of the first deflection by the first evaluation arrangement produces first detection signals, which are a function of the first Coriolis force and thus of the rate of rotation about the second axis. Especially since the first Coriolis element is supported in a manner that allows torsional vibrations about an axis of rotation situated in particular parallel to the main extension plane, the first Coriolis force generates the first deflection, which is able to be measured by the first detection arrangement. The detection arrangement preferably includes detection electrodes, which measure the first deflection in a capacitive manner. The design of the first Coriolis element as balancing rocker allows for a fully differential evaluation of the signals from the first detection arrangement. The present invention therefore enables a fully differential detection of the first rate of rotation using only a single Coriolis element, thereby reducing the required space considerably in comparison with conventional devices, so that a more cost-effective production of the rate-of-rotation sensor and a simpler implementation of the rate-of-rotation sensor is made possible.

According to a preferred further development, the rate-of-rotation sensor has a second Coriolis element, the excitation arrangement being provided for inciting vibrations of the second Coriolis element in the first direction, and second detection arrangement being provided in addition for detecting a second deflection of the second Coriolis element in a second direction that is generally perpendicular both to the first direction and also to the third direction. In a particularly advantageous manner, a fully differential detection both of the first deflection and the second deflection is made possible on relatively small space; in particular, it is possible to evaluate rates of rotation about the second and the third axis in fully differential manner. The excitation arrangement induces vibrations in the second Coriolis element parallel to the first direction. A second rate of rotation of the rate-of-rotation sensor about a third axis parallel to the third direction generates a second Coriolis force on the second Coriolis element, which acts parallel to the second direction and causes the second deflection of the second Coriolis element due to the fact that the second Coriolis element is supported in a manner that allows it to vibrate at least with respect to the second direction. The measurement of the second deflection by the second evaluation arrangement generates second detection signals, which are a function of the second Coriolis force and thus of the second rate of rotation about the third axis. The first evaluation arrangement preferably includes comb structures for carrying out a capacitive measurement, which are situated in the interior of the second Coriolis element, in particular, so that it is possible to evaluate the second detection signals in a fully differential manner.

According to another preferred development, an axis of rotation of the balancing rocker runs parallel to the main extension plane, the balancing rocker preferably having an asymmetrical mass distribution with regard to the axis of rotation, and the axis of rotation running generally parallel to the first direction or the second direction in an especially preferred manner. Due to the asymmetrical mass distribution of the balancing rocker with respect to the axis of rotation, the first Coriolis force advantageously generates a rotary motion of the balancing rocker about the axis of rotation. This rotary motion induces the first deflection, which is detected, preferably by the first detection arrangement, and evaluated fully differentially. In a particularly preferred manner, the measurement of the first deflection by the first detection arrangement is based on a capacitive measurement between the detection electrodes and at least one counter electrode, the counter electrode being disposed on the balancing rocker in an especially preferred manner and/or being formed by the balancing rocker itself. The signals from the detection electrodes are able to be evaluated in a fully differential manner, particularly without requiring additional detection electrodes on a side of the first Coriolis element situated across from the substrate, perpendicular to the main extension plane.

According to a further preferred development, the first detection arrangement includes a first detection arrangement component and an additional first detection arrangement component, the axis of rotation or a plane running parallel to the axis of rotation and parallel to the third direction preferably being disposed between the first detection arrangement component and the further first detection arrangement component. A fully differential evaluation of the first rate of rotation is therefore made possible in a particularly advantageous manner, a first detection signal from the first detection arrangement component being evaluated in a fully differential manner with an additional first detection signal from the additional detection arrangement component.

According to a further preferred development, the first Coriolis element is mounted on a frame with the aid of first springs, and the second Coriolis element with the aid of second springs, the frame preferably being fixed in place on the substrate by third springs, and the excitation arrangement exciting the frame to vibrations in an especially preferred manner. The first and the second Coriolis element are interconnected via the frame in a particularly advantageous manner, so that an identical vibration excitation of both the first and the second Coriolis element is brought about solely by exciting the frame. In an especially preferred manner, the excitation arrangement is developed as comb drives, which are situated on two opposite sides of the frame in an especially preferred manner and which excite the resonant frequency of the frame in alternation.

According to an additional preferred development, the second and/or the third springs include U-springs and preferably meander-type U-springs, and/or the first springs include torsion springs and torsion springs preferably having slot- or ladder-type structures, the second spring preferably exhibiting softness only in the second direction, the third spring only in the first direction, and/or the first spring only with respect to a torsion about the axis of rotation. In an advantageous manner, undesired rotary motions of the first Coriolis element resulting from the vibration are suppressed in that the torsion springs are implemented as slotted spring or ladder-type spring, since such torsion springs allow rotary motions about the axis of rotation and at the same time are relatively torsion-resistant with respect to rotary motions perpendicular to the main extension plane. The ladder-type springs feature two parallel bars, in particular, which are connected to each other by a multitude of crossbars. In a particularly advantageous manner, the second and/or third springs are implemented as U-springs since they have relatively low non-linearity. In an especially preferred manner, these springs are given a meander-type shape, so that relatively low spring stiffness is able to be realized in the preferred direction.

According to a further preferred development, a third detection arrangement is provided for detecting the vibration of the frame, the third detection arrangement and/or the excitation arrangement preferably taking the form of comb structures. Since the first and the second Coriolis force are not only a function of the first and second rate of rotation but also of the vibration parallel to the first axis, it is advantageous to measure the vibration with the aid of the third detection arrangement. In a particularly advantageous manner, only third detection arrangement is required to measure the vibration of the frame due to the fact the first and the second Coriolis element are connected by the frame. In an especially preferred manner, the third detection arrangement is developed as capacitively measuring comb structures situated on two diametrically opposed sides of the frame.

According to another preferred development, the second detection arrangement is designed as comb structures, which are disposed in a plane running parallel to a main extension plane of the substrate, preferably together with the second Coriolis element, and/or the second detection arrangement is disposed in a direction running perpendicular to the main extension plane, in overlapping manner with respect to the first Coriolis element. In an especially preferred manner, the second detection arrangement is situated in the interior of a recess of the second Coriolis element, so that the required surface area of the rate-of-rotation sensor is relatively low.

According to a further preferred development, first stops for restricting a first movement of the first Coriolis element in the first, second and/or third direction, second stops for restricting a second movement of the second Coriolis element in the first, second and/or third direction, and/or third stops for restricting a third movement of the frame in the first, second and/or third direction are provided. In an especially advantageous manner, the rate-of-rotation sensor is thus protected from damage when relatively large acceleration forces are acting on it. Short-circuits, spring breaks, interlocking or the formation of particles, in particular, are avoided in excess loading because the movement of the movable elements is restricted. Preferably, elastic or springy stops are provided.

According to a further preferred development, an adapted mass distribution of the frame, an adapted placement of the third springs, and/or a mirror-symmetrical structure of the rate-of-rotation sensor with respect to an axis of symmetry parallel to the first direction are provided in order to balance the frame with respect to the vibration. The occurrence of rotational terms of the vibration of the frame caused by the asymmetrical mass distribution of the balancing rocker, in particular, is suppressed by such a mirror-symmetrical structure in an especially advantageous manner. Specifically, the frame features a completely mass-symmetrical distribution with respect to the first axis or the vibration direction. In a particularly preferred manner, it is also possible to suppress an inhomogeneous mass distribution and/or an uneven form of the frame by adapting the placement of the third spring in order to suppress rotational terms in the vibration. Toward this end the third springs are placed in such a way that the frame is generally completely balanced with regard to its vibration.

An additional subject matter of the present invention is a method for operating a rate-of-rotation sensor, the first detection arrangement generating at least one first and an additional first detection signal, the first and the additional first detection signal being a function of a rotary motion of the rate-of-rotation sensor about a second axis parallel to the second direction. In an especially advantageous manner, a fully differential evaluation of a rate of rotation about the second axis is made possible using only a single Coriolis element.

According to a preferred further development, the first detection signal is generated by the first detection arrangement component, and the further detection signal is generated by the further detection arrangement component. In a particularly advantageous manner, a rotation of the first Coriolis element about the axis of rotation due to the first Coriolis force is thus measured both by the first detection arrangement component and also by the further detection arrangement component, so that the first detection signal is able to be evaluated with the additional first detection signal in a fully differential manner for the relatively precise detection of the first rotational rates, while featuring the smallest number of interference effects possible.

According to an additional preferred further development, a second and a further second detection signal are generated by the second detection arrangement, the second and the further second detection signal being a function of a rotary motion of the rate-of-rotation sensor about a third axis parallel to the third direction. In a particularly advantageous manner, it is therefore possible to measure both the first rate of rotation about the second axis and the second rate of rotation about the third axis simultaneously and in a fully differential manner using a single rate-of-rotation sensor, which has only two Coriolis elements. Because of the detection of the rates of rotation using only two Coriolis elements, the rate-of-rotation sensor is able to be realized in a considerably more compact and thus more cost-effective manner than was conventional.

According to a preferred development, the first and the additional first detection signal are evaluated differentially, and/or the second and the further second detection signal are evaluated differentially. This considerably increases the precision of the measurement of the first and/or the second rate of rotation in a particularly advantageous manner since both the signal from the first and the signal from the second detection arrangement are able to be corrected with regard to potential error influences in the fully differential signal processing.

Exemplary embodiments of the present invention are illustrated in the figures and explained in detail below.

DETAILED DESCRIPTION OF EXAMPLE EMBODIMENTS

Figure 1:
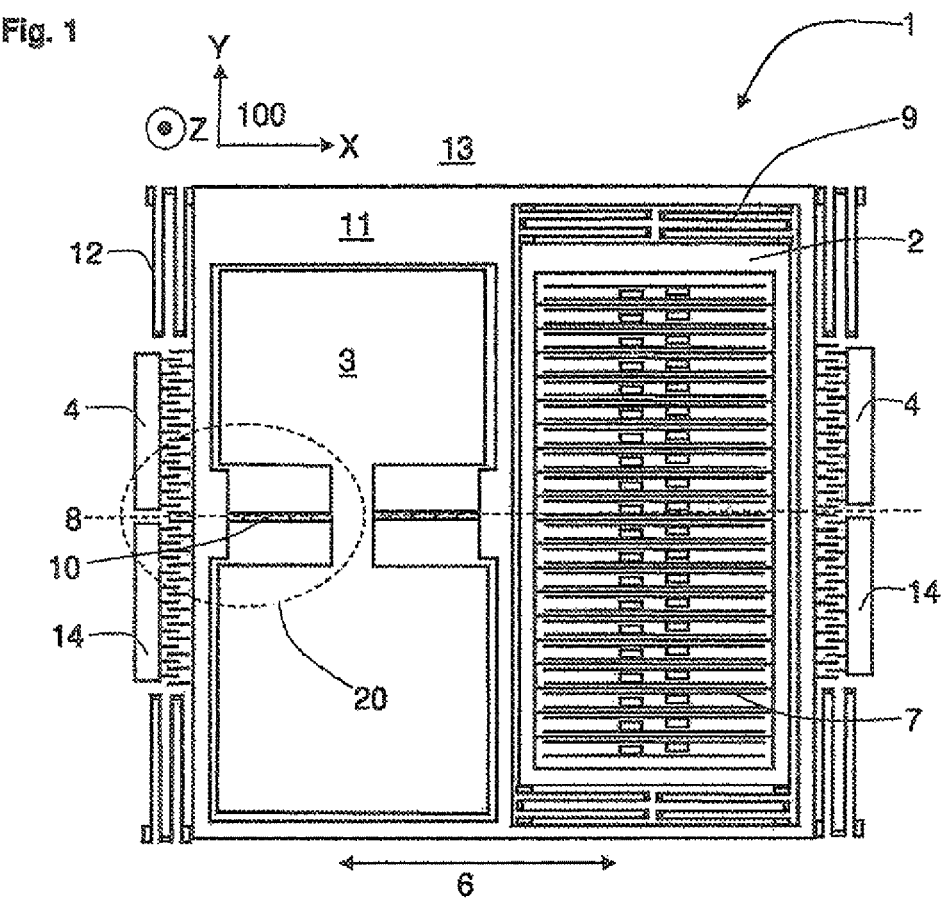
FIG. 1 shows a schematic plan view of a rate-of-rotation sensor according to a first specific embodiment of the present invention.

In the figures, identical components have been provided with the same reference numerals and thus are usually also labeled only once.

FIG. 1 shows a schematic plan view of a rate-of-rotation sensor 1 according to an exemplary first specific development of the present invention; rate-of-rotation sensor 1 has a substrate 13, a first Coriolis element 3, and a second Coriolis element 2, excitation arrangement 4 developed as comb structures being provided for the capacitive excitation 6 of vibrations of first and second Coriolis elements 3, 2 in a first direction X, second detection arrangement 7 being provided for detecting a second deflection of second Coriolis element 2 in a second direction Y which is generally perpendicular to first direction X, and first detection arrangement being provided for detecting a first deflection of first Coriolis element 3 in a third direction Z which is generally perpendicular both to the first and second direction X, Y, respectively. First Coriolis element 3 is designed as balancing rocker, the balancing rocker having an axis of rotation 8 parallel to a main extension plane 100 of substrate 13 and parallel to first direction X, the balancing rocker having an asymmetrical mass distribution with respect to axis of rotation 8. First detection electrodes of the first detection arrangement are situated underneath the balancing rocker or perpendicular to main extension plane 100 on the side of substrate 13 with respect to the balancing rocker, which detection electrodes generate first and additional first detection signals as a function of a first Coriolis force acting on the balancing rocker, and thus also as a function of a first rate of rotation of rate-of-rotation sensor 1 about a second axis parallel to second direction Y. These first and additional first detection signals are evaluated with one another in a fully differential manner. Second detection arrangement 7 are designed as capacitively measuring comb structures in a plane parallel to main extension plane 100 with second Coriolis element 2; second detection arrangement 7 is disposed in a recess in the interior of second Coriolis element 2, and second detection arrangement 7 generates a second and a further second detection signal which is a function of a first Coriolis force acting on second Coriolis element 2 parallel to second direction Y, and thus also a function of a second rate of rotation of rate-of-rotation sensor 1 about a third axis parallel to third direction Z. The second and the further second detection signal are preferably likewise analyzed in a fully differential manner. Second Coriolis element 2 is mounted on a frame 11 with the aid of second springs 9, and first Coriolis element 3 is mounted on a frame 11 with the aid of first springs 10, frame 11 being affixed on substrate 13 by third springs 12. Vibrations of first and second Coriolis elements 3, 2 brought about by the excitation of vibrations of frame 11 with the aid of excitation arrangement 4, which is situated on frame 11 in the form of comb structures at two sides of frame 11 lying diametrically opposed in first direction X. Third detection arrangement 14, likewise developed as comb structures, is situated next to excitation arrangement 4 in the second direction, the detection arrangement measuring the vibration of frame 11 in a capacitive manner. Second and third springs 9, 12 are developed as meandering U-springs, while first springs 10 include torsion springs having ladder structures, second spring 9 having a soft design only in second direction Y, third spring 12 only in first direction X, and first spring 10 only with respect to a torsion about axis of rotation 8. Furthermore, third springs 12 are preferably designed or disposed on frame 11 in such a way that frame 11 is balanced with respect to vibration 6.

Figure 2A:
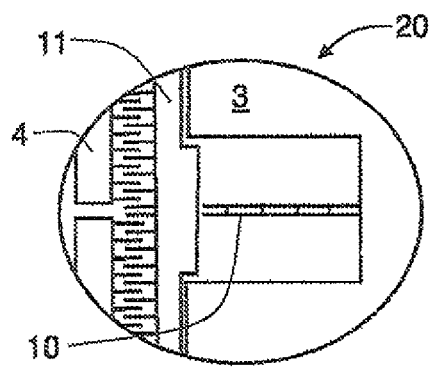
FIG. 2a shows a schematic plan view of a subsection of a rate-of-rotation sensor according to the first specific embodiment of the present invention.

FIG. 2a shows a schematic plan view of a subsection 20 of a rate-of-rotation sensor 1 according to the first specific embodiment of the present invention; illustrated subsection 20 features first spring 10, first spring 10 having two parallel bars which are interconnected by a multitude of crossbars. A torsion spring or first spring 10 designed in this manner in particular permits rotary motions about axis of rotation 8 while simultaneously being relatively torsionally rigid with respect to rotary motions perpendicular to the main extension plane. This suppresses Coriolis forces acting on first Coriolis element 3, particularly parallel to second direction Y, and also rolling motions caused by the vibration of the frame parallel to first direction X and the asymmetrical mass distribution of the balancing rocker, and/or rotary motions about an axis parallel to third direction Z of first Coriolis element 3.

Figure 2B:
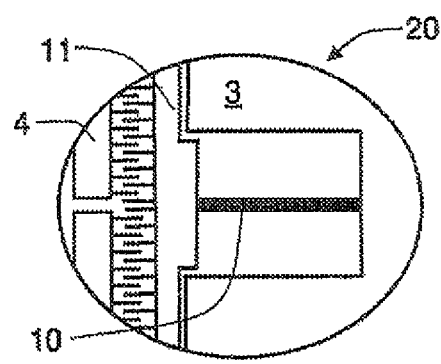
FIG. 2b shows a schematic plan view of a subsection of a rate-of-rotation sensor according to a second specific embodiment of the present invention.

FIG. 2b is a schematic plan view of a subsection 20 of a rate-of-rotation sensor according to a second specific embodiment of the present invention, the second specific embodiment being completely identical to the first specific embodiment illustrated in FIG. 1 and FIG. 2a, except for the sole difference that first spring 10 is developed as single spring.

Figure 2C:
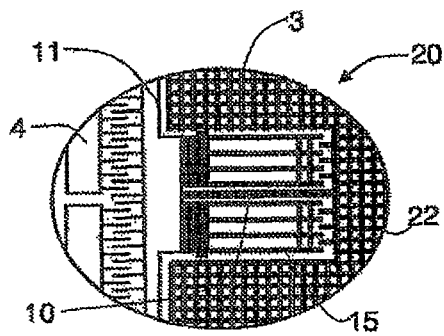
FIG. 2c shows a schematic plan view of a subsection of a rate-of-rotation sensor according to a third specific embodiment of the present invention.

FIG. 2c is a schematic plan view of a subsection 20 of a rate-of-rotation sensor 1 according to a third specific embodiment of the present invention, third specific embodiment being identical to the first specific embodiment illustrated in FIGS. 1 and 2a, rate-of-rotation sensor 1 additionally having a first stop 15, which restricts a movement of first Coriolis element 3 both in the first and the second direction X, Y, respectively. First stop 15 is developed as flexible first stop 15, in particular, so that the movement of first Coriolis element 3 in first and/or in second direction X, Y beyond an individual maximum deflection well defined by first stop 15 is stopped in a relatively gentle manner. First Coriolis element 3 also has perforation holes 22.

Figure 3:
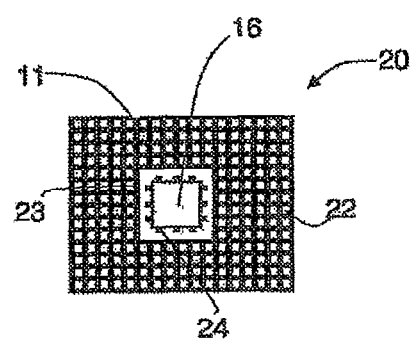
FIG. 3 shows a schematic plan view of a further subsection of a rate-of-rotation sensor according to a fourth specific embodiment of the present invention.

FIG. 3 is a schematic plan view of an additional subsection 20 of a rate-of-rotation sensor 1 according to a fourth specific embodiment of the present invention; fourth specific embodiment is generally identical to the first specific embodiment, the further subsection having frame 11 and a third stop 16. Third stop 16 is permanently joined to substrate 13, in particular, and situated in a recess 23 of frame 11 in such a way that a movement of the frame both in first direction X and in second direction Y is restricted by an individual stop contact with the aid of third stop 16. Third stop 16 preferably also includes a stop knob 24.

Figure 4:
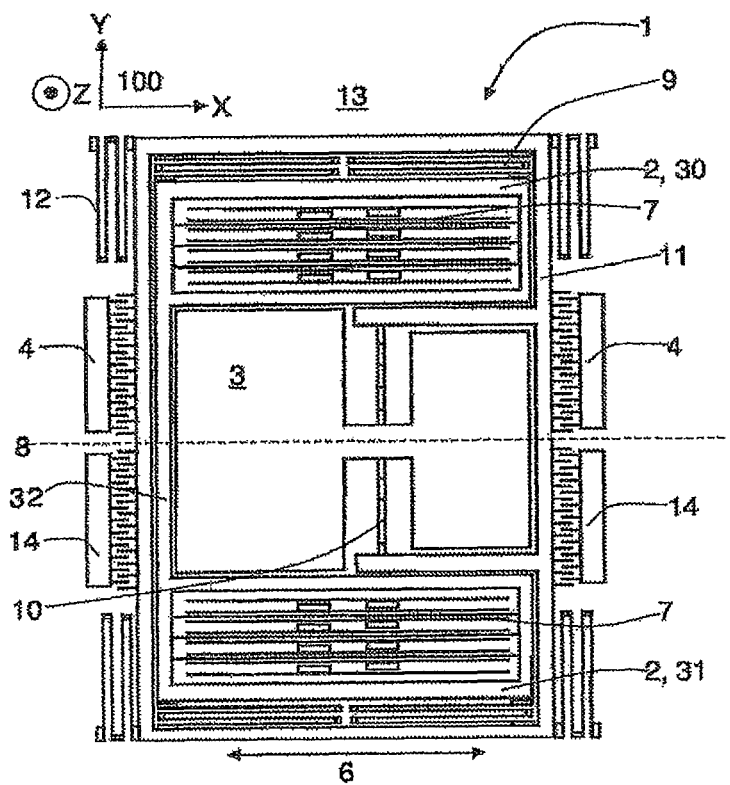
FIG. 4 shows a schematic plan view of a rate-of-rotation sensor according to a fifth specific embodiment of the present invention.

FIG. 4 shows a schematic plan view of a rate-of-rotation sensor according to a fifth specific embodiment of the present invention, the fifth specific embodiment generally being identical to the first specific embodiment illustrated in FIG. 1, first and second Coriolis elements 3, 2 being disposed in such a way that rate-of-rotation sensor 1 or at least frame 11 has an essentially symmetrical and particularly mass-symmetrical design with respect to an axis of symmetry 8 running in first direction X, the axis of symmetry being situated in the center of the frame with respect to second direction Y. First Coriolis element 3 has an axis of rotation that lies parallel to second direction Y, while second Coriolis element 2 is subdivided into a first and a second part 30, 31 with respect to axis of symmetry 8. First and second part 30, 31 are rigidly interconnected by way of a rigid connecting bar 32, first Coriolis element 3 being situated between first and second part 30, 31.

What is claimed is:

1. A rate-of-rotation sensor, comprising:
   a first Coriolis element, the first Coriolis element being a balancing rocker;
   an excitation arrangement adapted to excite vibrations of the first Coriolis element in a first direction;
   a second Coriolis element, the excitation arrangement adapted to excite vibrations of the second Coriolis element in the first direction;
   a first detection arrangement to detect a first deflection of the first Coriolis element in a third direction which is perpendicular to the first direction; and
   a second detection arrangement to detect a second deflection of the second Coriolis element in a second direction, which is perpendicular both to the first direction and to the third direction.

2. The rate-of-rotation sensor as recited in claim 1, wherein an axis of rotation of the balancing rocker runs parallel to a main extension plane of a substrate on which the sensor is formed, the balancing rocker having an asymmetrical mass distribution with respect to an axis of rotation, and the axis of rotation extending parallel to one of the first direction or to the second direction.

3. The rate-of-rotation sensor as recited in claim 1, wherein the first detection arrangement includes a first detection arrangement component and a further first detection arrangement component, an axis of rotation extending between the first detection arrangement component and the further first detection arrangement component.

4. The rate-of-rotation sensor as recited in claim 1, wherein the first detection arrangement includes a first detection arrangement component and a further first detection arrangement component, a plane running parallel to an axis of rotation extending between the first detection arrangement component and the further first detection arrangement component.

5. The rate-of-rotation sensor as recited in claim 1, wherein the first detection arrangement includes a first detection arrangement component and a further first detection arrangement component, a plane running parallel to the third direction extending between the first detection arrangement component and the further first detection arrangement component.

6. The rate-of-rotation sensor as recited in claim 1, wherein the first Coriolis element is affixed on a frame using first springs, the frame is fixed in place on a substrate on which the sensor is formed using third springs, and the excitation arrangement excites the frame to vibrations.

7. The rate-of-rotation sensor as recited in claim 6, wherein the first springs include torsion springs including one of slot or ladder structures, the first springs having a soft design only with respect to the torsion about the axis of rotation.

8. The rate-of-rotation sensor as recited in claim 6, further comprising:
   a third detection arrangement to detect the vibration of the frame;
   wherein at least one of the third detection arrangement and the excitation arrangement is a comb structure.

9. The rate-of-rotation sensor as recited in claim 6, further comprising: at least one of first stops, second stops and third stops, the first stops to restrict a first movement of the first Coriolis element in at least one of the first, second and third direction, the second stops to restrict a second movement of the second Coriolis element in at least one of the first, second and third direction, and the third stops to restrict a third movement of the frame in at least one of the first, second, and third direction.

10. The rate-of-rotation sensor as recited in claim 6, wherein at least one of a mass distribution of the frame, a placement of the third springs, and a mirror-symmetrical design of the rate-of-rotation sensor with respect to an axis of symmetry parallel to the first direction is adapted to balance the frame with respect to the vibration.

11. The rate-of-rotation sensor as recited in claim 1, wherein the second Coriolis element is affixed on a frame using second springs, the frame is fixed in place on a substrate on which the sensor is formed using third springs, and the excitation arrangement excites the frame to vibrations.

12. The rate-of-rotation sensor as recited in claim 11, wherein at least one of the second and the third springs include meander-type U-springs, the second springs having a soft design only in the second direction, and the third springs only in the first direction.

13. The rate-of-rotation sensor as recited in claim 1, wherein the second detection arrangement is a comb structure disposed together with the second Coriolis element in a plane running parallel to a main extension plane of a substrate on which the sensor is formed.

14. The rate-of-rotation sensor as recited in claim 1, wherein the first detection arrangement is disposed in the third direction in an overlapping manner with respect to the first Coriolis element.

15. A method for operating a rate-of-rotation sensor, the sensor including a first Coriolis element, the first Coriolis element being a balancing rocker, an excitation arrangement adapted to excite vibrations of the first Coriolis element in a first direction, and a first detection arrangement to detect a first deflection of the first Coriolis element in a third direction which is perpendicular to the first direction, the sensor further including a second Coriolis element, the excitation arrangement adapted to excite vibrations of the second Coriolis element in the first direction, and a second detection arrangement to detect a second deflection of the second Coriolis element in a second direction, which is perpendicular both to the first direction and to the third direction, the method comprising:
   generating, by the first detection arrangement, at least one first and one further first detection signal, the first and the further first detection signal being a function of a rotary motion of the rate-of-rotation sensor about a second axis parallel to the second direction; and
   generating a second detection signal and a further second detection signal by the second detection arrangement, the second and the further second detection signal being a function of a rotary movement of the rate-of-rotation sensor about a third axis parallel to the third direction.

16. The method as recited in claim 15, wherein the first detection signal is generated by a first detection arrangement component, and the further detection signal is generated by a further detection arrangement component.

17. The method as recited in claim 15, wherein the first and the further first detection signal are analyzed differentially.

18. The method as recited in claim 15, wherein the second and the further second detection signal are analyzed differentially.

* * * * *

UNITED STATES PATENT AND TRADEMARK OFFICE
CERTIFICATE OF CORRECTION

PATENT NO. : 8,443,666 B2  
APPLICATION NO. : 12/747846  
DATED : May 21, 2013  
INVENTOR(S) : Classen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 405 days.

Signed and Sealed this
Eighth Day of September, 2015

Michelle K. Lee
*Director of the United States Patent and Trademark Office*